Aug. 22, 1950     T. R. YEZDAN     2,519,727
RANGE FINDER
Filed July 5, 1947     2 Sheets-Sheet 1
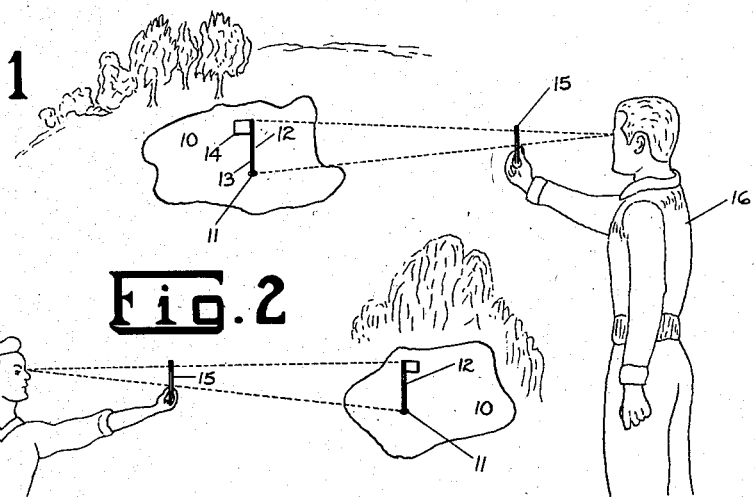
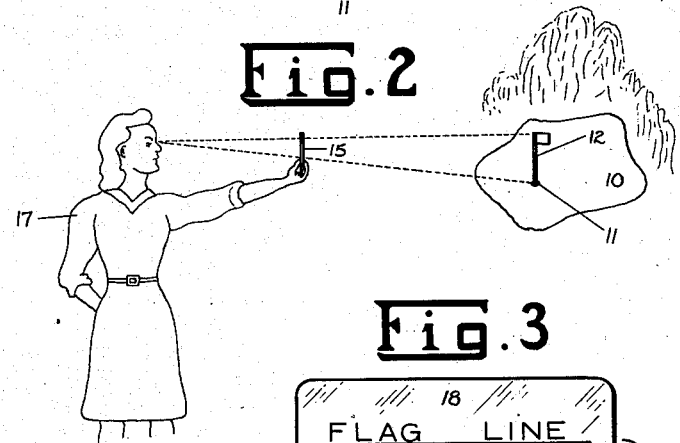
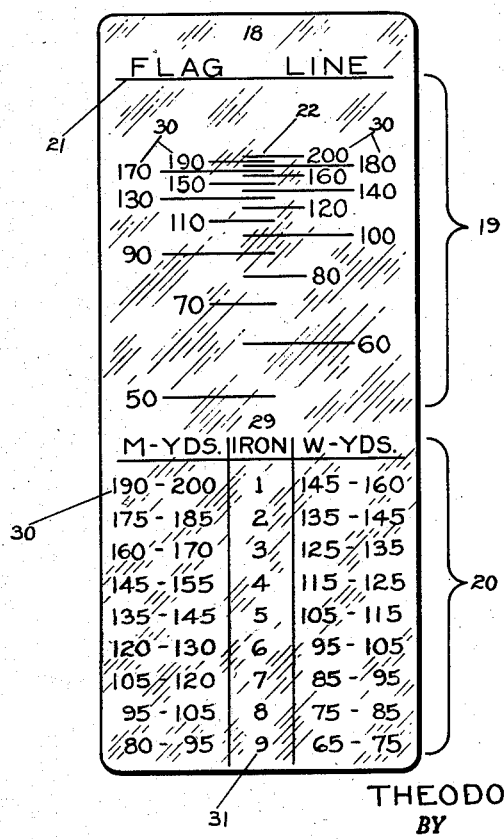
INVENTOR:-
THEODORE R. YEZDAN
BY
ATTORNEYS Aug. 22, 1950 — T. R. YEZDAN — 2,519,727
RANGE FINDER
Filed July 5, 1947 — 2 Sheets-Sheet 2
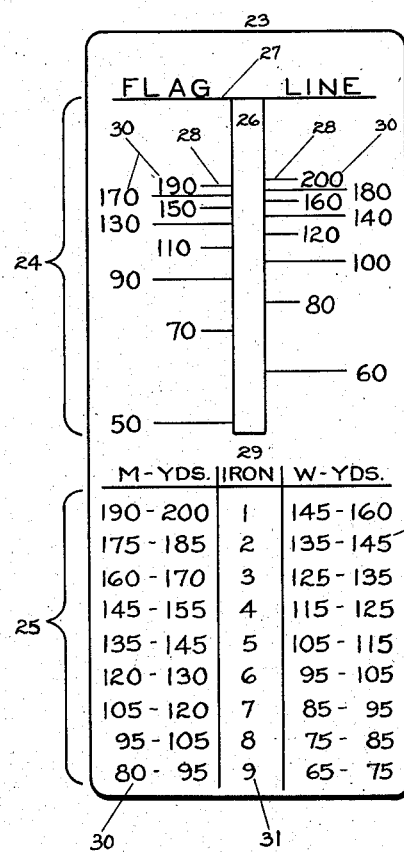
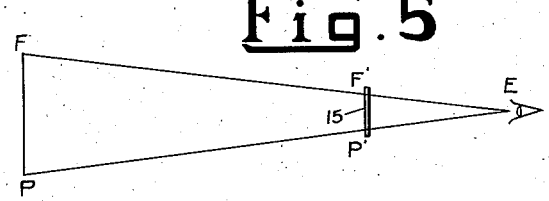
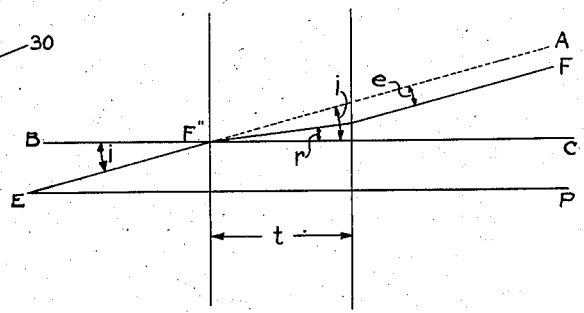
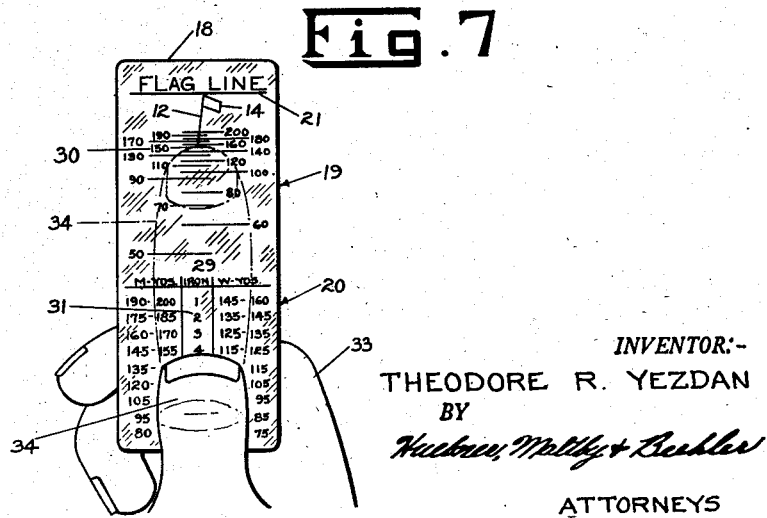
INVENTOR:-
THEODORE R. YEZDAN
BY
ATTORNEYS Patented Aug. 22, 1950

2,519,727

UNITED STATES PATENT OFFICE 2,519,727

RANGE FINDER

Theodore R. Yezdan, Fresno, Calif.

Application July 5, 1947, Serial No. 759,138

3 Claims. (Cl. 33—64)

The present invention relates to range finders and more particularly to range finders for golfers adapted to the determination of distances to golf-cup-marking-flags, commonly referred to as pins, and the designation of the appropriate golf clubs to employ in traversing said distances.

Of all the factors productive of wasted strokes in golfing one of the most prolific is the selection of golf clubs for particular shots that are not suited to the specific purpose. This frequently arises from an inability to judge a given distance to be traversed. Inasmuch as golf pins are of uniform height, a convenient object is available at each cup for sighting and range finding purposes.

An object of the present invention is to furnish a simple device for determining the distance to an object, a visible dimension of which is known.

Another object is to eliminate calculations in connection with such measuring.

Another object is to provide range finders particularly suited to golfing requirements.

Another object is to provide a range finder that is simple and economical in construction.

Other objects are to provide a compact, light weight, easily portable device conveniently employed by golfers in the measurement of distances to golf pins being approached and to designate the appropriate golf clubs to be employed in traversing said distances.

Further objects and advantages will become apparent from the subsequent description in the specification.

In the drawings:

Fig. 1 is a perspective view of a typical golf green indicating a male golfer employing a device of the present invention to measure the distance to a pin on said green.

Fig. 2 is a perspective view of a golfing green showing a device of the present invention employed by a female golfer to measure the distance to the pin on said green.

Fig. 3 is a front elevational view of a transparent form of the present invention.

Fig. 4 is a front elevation of a second form of the present invention fabricated from opaque material.

Fig. 5 illustrates the employment of a device of the present invention and is used to demonstrate the calibrating of graduations formed thereon.

Fig. 6 is a fragmentary enlargement of a section of the transparent form of the present invention illustrating refractory correction.

Fig. 7 is a front view of a device of the present invention illustrative of the convenient translation of determined distances into appropriate golf clubs to employ by thumb index.

Referring in greater detail to the drawings:

In Fig. 1, a conventional golf green is indicated generally at 10 having a cup 11 provided therein and marked by a pin 12 in the conventional manner. Standard golf pins consist of a staff portion 13 and a flag 14, the top of the flag being substantially 90 inches from the surface of the green. A device of the present invention is indicated at 15 as employed by a male golfer 16.

The green 10, cup 11, pin 12, and device of the present invention 15 are again shown in Fig. 2. A female golfer 17 is shown holding the device as normally employed by women golfers. Men preferably hold the device in an erect position at arm's length forwardly extended, as shown. Women preferably employ the device in erect position at arm's length sidewardly directed. It has been discovered that by employing the different arm positions for men and women differences in arm lengths are sufficiently compensated for to permit a common calibration of the range finders for both men and women. It has further been discovered that an average of the eye to range finder distances for men and women when the range finders are held as described approximates 25 inches. For purposes of calibration, it is assumed that the eye to range finder distance is 25 inches, variations therefrom being of such magnitude as to be insignificant in the measurement of distances for the purposes to which the present range finder is provided.

In Fig. 3, a transparent form of the present invention is illustrated comprising a plate 18 of transparent material, such as Plexiglas or other suitable material. The plate has a sighting portion 19 and a grip portion 20. A flag line or zero point is provided in the sighting portion, as at 21. Inasmuch as the range finders of the present invention are adapted to be held in a substantially vertical position, the zero point is preferably provided in the upper end of said sighting portion. Graduations 22 are formed in said sighting portion in substantially vertical alignment ranging from the zero point.

In Fig. 4, an opaque form of the present invention is illustrated comprising plate 23 of sheet metal, opaque plastic, or other suitable material preferably of rectangular form. The plate 23 has a sighting portion 24 and a grip portion 25. A sighting slot 26 is formed longitudinally of the plate through the sighting portion. The upper end of the slot preferably comprises a flag line or zero point 27 for the opaque form of the range finder. Graduations 28 are provided at alternate sides of the slot ranging downwardly from the zero point.

A chart indicated generally at 29 is provided on the grip portions 20 and 25, respectively, of the two forms of the present invention in substantial alignment with the graduations 22 and 28 thereof. Numerical factors 30 are arranged adjacent the graduations on both forms of the invention to designate distances to the sighted pin. Numbers 31, designating conventional golf clubs, are provided in columnar arrangement longitudinally of the charts 29 in each form of the present invention. At opposite sides of the club designating numbers 31, the numerical factors 30 are repeated in arrangements indicative of appropriate clubs for male and female golfers to employ for the distances designated by said numerical factors.

In Fig. 5, the pin 12 is schematically illustrated at FP. E represents the eye of a person employing the range finder and 15 a device of the present invention of either form. In employing the range finder 15 the zero point 21, or 27, marked thereon is sighted to alignment with point F representative of the top of the flag 14. The graduations 22 and 28 are spaced and calibrated so that a graduation is simultaneously sighted to alignment with the bottom of the pin 12. EP designates the distance to the pin from E. EF represents a sight line to the top of the pin and EP a sight line to the bottom of the pin. The points at which these sight lines intersect the range finder 15 are conveniently designated F'' and P'. F'P' is substantially parallel to FP. Angle FEP is common to the triangles EF'P' and EFP. Line EP comprises the base of both triangles. Thus the two triangles are similar. Being similar the following formula expresses the relationship of the sides:

$$\frac{F'P'}{EP'} = \frac{FP}{EP}$$

FP is conventionally 90 inches in height. As previously described, EP' is 25 inches. Thus, by assuming various distances EP normally encountered in golfing and employing the above formula the graduations 28 are readily calibrated. For example, substituting the known factors in the above formula and computing for a distance of 200 yards, converted to inches:

$$\frac{F'P'}{25} = \frac{90}{200 \times 36}$$

$$F'P' = \frac{90 \times 25}{200 \times 36}$$

$$F'P' = .31250 \text{ inches}$$

Thus the graduation which would be sighted to alignment on the base of the pin when the range finder is held 25 inches from the eye of the observer would be .31250 inches below the zero point 28. The numerical factor 200 is provided adjacent said graduation designating that the distance to the pin is 200 yards when said graduation falls on the line of sight to the bottom of the pin as the zero point is sighted to the top of the pin in the manner described. The spacing of additional graduations 28 are computed in the same manner in ten yard intervals.

It will be apparent that corrections for the error e (Fig. 6) caused by a plate of thickness t incident to refraction in the transparent plate 18 may be made if desired.

In Fig. 7, a hand of a golfer is shown at 33 in grasping relation to the grip portion 20 of the transparent form of the present invention and with the thumb 34 overlying the sight portion 19 thereof. The golfer holds the device at arm's length, forwardly directed as in Fig. 1 if a man, and sidewardly directed as in Fig. 2 if a woman. The flag line 21 is sighted to alignment with the top of the flag 14 and the thumb moved over the graduations as a convenient index and the apparent height of the pin 12 observed between the flag line and the thumb as shown in dotted line in Fig. 7. So employed, a selected graduation is at least in approximate sighted alignment with the base of the pin. Adjacent said graduation and thumb a numerical factor 30 designates the distance to the pin. The thumb is then flexed, as shown in full line, to the same numerical factor, for a male or female golfer, as the case may be, in the chart 29 and the proper golf club to traverse the measured distance read directly from the appropriate club designation 31. Although the utilization of the range finders of the present invention has been explained in terms of the transparent form, it will be clearly apparent that the opaque form of Fig. 4 is employed in the same manner, the pin 12 being observed through the slot 26.

The devices of the present invention are simple in form and economical to produce. Distances to objects having a known visible dimension are easily measured without requiring calculations. The devices are particularly suited to distance determination for golfers in sighting to a 90 inch pin but may readily be graduated for other sighting objects and dimensions. The range finders are compact, lightweight, easily portable, and readily accessible not only for measuring distances but for designating appropriate golf clubs for distances to be traversed.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices and systems.

Having described my invention, what I claim as new and desire to secure by Letters Patent is:

1. A golf range finder adapted to suggest an appropriate golf club to employ in traversing the distance to an erect golf pin whose vertical dimensions are known, comprising a member adapted to be held in an erect position and having an upwardly extended sight portion, a zero point in the sight portion, graduations downwardly spaced from the zero point in the sight portion adapted for the simultaneous sighting of one thereof to alignment with the lower visible limit of the pin while the zero point is sighted to alignment with the top of the pin, indicia borne by the sight portion individual to the graduations, and a chart provided on the member below the graduations and in substantial alignment therewith including in corresponding order the indicia of the graduations and golf club designating numerals adjacent to said indicia indicating the appropriate club to employ in traversing the distance represented by the graduation individual to said club's indicia.

2. A golf range finder adapted to indicate by number an appropriate golf club to employ in traversing a distance to a golf pin of standard length comprising a plate having a transparent sight portion and a grip portion, a zero point in the sight portion adapted to be sighted to alignment with one end of a pin, graduations in the sight portion arranged in a line between the zero point and the grip portion adapted individually to be sighted to alignment with the opposite end of the pin concurrently with the sighting of the zero point, indicia individual to the graduations adjacent thereto, and a chart in the grip portion including in numerical order golf club designating numerals in alignment with the graduations and at opposite sides of the aligned golf club designating numerals repeated indicia of the graduations, the indicia at one side of the numerals being correlated therewith to designate the number of the appropriate club for women to employ and the indicia at the opposite side, the number of the appropriate golf club for men to employ in traversing a distance represented by the apparent length of the pin as viewed through the sight portion when held approximately twenty-five inches from the eye.

3. A golf range finder adapted to suggest an appropriate golf club to employ in traversing the distance to an erect golf pin whose vertical dimensions are known comprising a substantially rectangular transparent plate having opposite face surfaces adapted to be held in a substantially erect position normal to a line of sight to the pin with the thumb of the user overlying the face of said member disposed toward the user and movable by relative flexing and unflexing movements longitudinally of the member, a zero point adjacent to the top of the member adapted to be sighted to alignment with the top of a golf pin, graduations downwardly spaced from the zero point in the sight portion adapted for the simultaneous sighting of one thereof to alignment with the base of the pin while the zero point is sighted to alignment with the top of the pin, said graduations being within the range of the user's thumb as a citing index, indicia individual to the graduations, and a chart mounted in vertical alignment below the graduations within the range of the user's thumb in flexed positions including in corresponding order the indicia of the graduations and club designating numerals individual to said indicia correlated to suggest an appropriate number of club to employ in traversing a distance represented by a graduation cited to the base of the pin concurrently with the citing of the zero point to the top of the pin when the member is held at a predetermined distance from the eye.

THEODORE R. YEZDAN.

REFERENCES CITED

The following references are of record in the file of this patent:

UNITED STATES PATENTS

| Number | Name | Date |
|---|---|---|
| 53,420 | Daly | Mar. 27, 1866 |
| 444,406 | Andrews et al. | Jan. 6, 1891 |

FOREIGN PATENTS

| Number | Country | Date |
|---|---|---|
| 2,160 | Great Britain | Feb. 10, 1915 |
| 72,284 | Switzerland | May 1, 1916 |
| 805,292 | France | Aug. 22, 1936 |